United States Patent [19]

Nakamura et al.

[11] Patent Number: 5,046,315
[45] Date of Patent: Sep. 10, 1991

[54] MASTER CYLINDER

[75] Inventors: Yoshihiro Nakamura; Naganori Koshimizu, both of Yamanashi; Hideaki Ishii, Chiba, all of Japan

[73] Assignee: Tokico, Ltd., Kanagawa, Japan

[21] Appl. No.: 437,435

[22] Filed: Nov. 16, 1989

[30] Foreign Application Priority Data

Nov. 18, 1988 [JP] Japan .................. 63-291483

[51] Int. Cl.⁵ .................. B60T 11/20; F01B 11/02
[52] U.S. Cl. .................. 60/562; 60/562; 92/169.1; 92/171.1
[58] Field of Search .................. 92/169.1, 171.1; 60/533, 588, 585, 562

[56] References Cited

U.S. PATENT DOCUMENTS

| | | | |
|---|---|---|---|
| 4,175,392 | 11/1979 | Morimoto | 60/588 |
| 4,249,381 | 2/1981 | Gaiser | 92/171.1 |
| 4,510,752 | 4/1985 | Gaiser | 92/171.1 |
| 4,649,707 | 3/1987 | Belart | 60/562 |
| 4,685,300 | 8/1987 | Steer | 60/562 |
| 4,745,751 | 5/1988 | Gaiser | |
| 4,781,024 | 11/1988 | Nakamura | 60/533 |
| 4,887,517 | 12/1989 | Shinohara | 92/171.1 |

Primary Examiner—John T. Kwon
Assistant Examiner—Thomas Denion
Attorney, Agent, or Firm—Wenderoth, Lind & Ponack

[57] ABSTRACT

A master cylinder includes a cylinder defining a cylinder bore therein with one end of the cylinder being open, a sleeve fitted into the cylinder bore, a piston slidably disposed in the sleeve, and a stopper mounted on the one end of the cylinder for abutting against the sleeve to prevent the sleeve from coming off the cylinder. The sleeve includes at least two sleeve members fitted into the cylinder bore in serial disposition from the inner end to the open end of the cylinder bore. A cup seal is disposed between two adjacent sleeve members of the aforementioned at least two sleeve members. The master cylinder further includes a resilient member for forcing one inner sleeve member of the two adjacent sleeve members onto the other sleeve member of the two adjacent sleeve members, thereby forcing the other sleeve member toward the stopper.

6 Claims, 3 Drawing Sheets

MASTER CYLINDER

BACKGROUND OF THE INVENTION

1. Field of the Invention

The present invention relates to a master cylinder for use in a brake system of a vehicle such as an automobile.

2. Description of the Prior Art

A master cylinder, especially a tandem type master cylinder which is provided with two oil pressurizing chambers, requires a relatively large mounting space on a vehicle. It is therefore desirable to make the axial length of the master cylinder as short as possible.

There are two types of tandem master cylinders, one in which cup seals are mounted on the piston and another in which cup seals are mounted on the cylinder. The latter is advantageous for shortening the master cylinder, and in this type, the cup seals are usually held by sleeves inserted into the cylinder.

A prior art master cylinder of this type is disclosed in Japanese Patent Public Disclosure (Kokai) No. 210160/87 which corresponds to U.S. Pat. No. 4,685,300. The master cylinder of this type will be explained with reference to FIG. 1. The master cylinder 100 comprises a cylinder 6 consisting of a cylinder body 2 provided with a bottom 1 and a cylinder cap 5 (referred to as "cap" hereafter) threaded in an opening 4 of a cylinder bore 3 of the cylinder body 2, an oil reservoir 7 mounted on the cylinder body 2 and communicating with the interior of the cylinder body 2, first, second and third sleeves 8, 9 and 10, respectively, which are fitted into the cylinder bore 3 of the cylinder 6 in the foregoing order from the bottom 1 side to the opening 4 and fixed in the cylinder by means of the cap 5 being threaded onto the cylinder body 2, primary and secondary pistons 12 and 11 slidably disposed in the cylinder 6 through the sleeves 8, 9 and 10, and springs 13 and 14 disposed in the cylinder 6 for biasing the secondary piston 11 and primary piston 12, respectively, toward the opening 4. An oil pressurizing chamber 15 is defined between the bottom 1 and the secondary piston 11 while another oil pressurizing chamber 16 is defined between the primary and secondary pistons 12, 11. The primary piston 12 extends outside the cylinder 6. In the extending end of the primary piston 12 is formed a recess 17 for receiving therein one end of an output shaft (not shown) connected to a brake pedal or one end of an output shaft of a booster (not shown). As shown, cup seals 22 and 23 are respectively disposed and sandwiched between a shoulder formed in the body 2 and the first sleeve 8 and between the second and third sleeves 9, 10.

When the primary piston 12 receives a driving force from the aforementioned output shaft (not shown), the primary piston 12 is displaced forward (leftward as viewed in FIG. 1) against the spring 14. When a communicating hole 19 formed in the primary piston 12 passes a communicating hole 18 formed in the third sleeve 10 and further passes the rearmost end surface 23a (rightmost as viewed in FIG. 1) of the cup seal 23, the brake oil in the oil pressurizing chamber 16 is pressurized to generate a braking oil pressure. The braking oil pressure thus generated is transmitted through an output port (not shown) communicating with the chamber 16 to the brake cylinder of a brake (not shown), associated with a wheel to operate the brake. At that time, the secondary piston 11 is also displaced in the same direction as the primary piston 12, namely leftward, against the spring 13 and, when a communicating hole 21 formed in the secondary piston 11 passes a communicating hole 20 formed in the first sleeve 8 and further passes the rearmost end surface 22a (rightmost as viewed in FIG. 1) of the cup seal 22, a braking oil pressure is generated in the oil pressurizing chamber 15. The braking oil pressure thus generated is transmitted through an output port (not shown) communicating with the chamber 15 to the brake cylinder of a brake, associated with a wheel, to operate the brake.

When the force acting on the aforementioned output shaft is released, the primary and secondary pistons 12, 11 are both returned backward (rightward as viewed in FIG. 1) by virtue of the forces of the springs 14 and 13, respectively.

When the pressure in the chambers 15 and 16 is reduced during the return stroke, the outer peripheral portions of the cup seals 22 and 23 are deflected by virtue of the pressure difference between the inner and outer sides thereof, so that the oil in the reservoir 7 flows through supplying ports 24 and 25 and through the clearances respectively defined between the outer peripheries of the cup seals 22, 23 and the inner surface of the cylinder bore 3 into the chambers 15 and 16.

A stepped portion 26 is formed in the cylinder bore 3 adjacent the bottom 1 while a stepped portion 27 is formed in the bottom portion of the cap 5. The front or left end of the first sleeve 8 abuts against the stepped portion 26 while the rear or right end of the third sleeve 10 abuts against the stepped portion 27.

A seal member 28 is disposed between the secondary piston 11 and the first and second sleeves 8, 9 while a seal member 29 is disposed between the primary piston 12, the third sleeve 10 and the cap 5.

The prior art master cylinder as explained above suffers, however, from the following problems. Since the first, second and third sleeves 8, 9 and 10 are fitted into the cylinder 6 and fixed in the space defined between the cylinder body 2 and the cap 5 by the cap 5 being threaded into the cylinder body 2 with the first sleeve 8 abutting against the stepped portion 26 of the cylinder body 2 and with the third sleeve 10 abutting against the stepped portion 27 of the cap, these three sleeves 8, 9 and 10 are compressed between the cylinder body 2 and the cap 5, which compression possibly results in the elements of the master cylinder 100 being buckled or becoming cracked. Further, ineffective strokes of the primary piston possibly vary widely. Ineffective stroke T is defined by the stroke of the primary piston 12 between the initial position thereof from which the primary piston 12 is displaced leftward (as viewed in FIG. 1) and the position where braking oil pressure is first generated in the chamber 16. The ineffective stroke T of the master cylinder 100 as shown in FIG. 1 is determined by the following equation.

$$T = (P_1 - P_2) - [(S_1 + S_2 S_3) - (L + \alpha)] \quad (1)$$

in which $P_1$ = distance between the open end of the cylinder body 2 and the bottom of the recess 17, $P_2$ = distance between the center line of the communicating hole 19 and the bottom of the recess 17, $S_1$ = axial length of the first sleeve 8, $S_2$ = axial length of the second sleeve 9, $S_3$ = distance between the rearmost end surface of the second sleeve 9 and the rearmost end surface of the cup seal 23, L = distance between the surface of the shoulder 26 of the cylinder body 2 against which the first sleeve 8 abuts and the opening end surface 2a of the cylinder body, and α = compressive height by which the first, second and third sleeves are totally compressed when the cap 5 is threaded into the cylinder body 2.

As shown by the above equation, the ineffective stroke T includes seven parameters which can have respective variations in their dimensions. As a result, the ineffective stroke T can vary widely, resulting in master cylinders with uneven performance characteristics.

SUMMARY OF THE INVENTION

In view of the above-described problems of the prior art, it is a primary object of the present invention to provide a master cylinder in which buckling or cracking of the elements of the master cylinder can be prevented and variations in ineffective strokes are considerably reduced.

To this end, the present invention provides a master cylinder comprising a cylinder having a cylinder bore formed therein, one end of the cylinder being opened, a sleeve fitted into the cylinder bore, a piston slidably disposed in the sleeve, and stop means mounted on the open end of the cylinder for abutting against the sleeve to prevent the sleeve from coming off the cylinder. The sleeve comprises at least two sleeve members fitted into the cylinder bore in serial disposition from the inner end to the open end of the cylinder. The master cylinder further comprises a cup seal disposed between two adjacent sleeve members of the aforementioned beforementioned at least two sleeve members and a resilient member for forcing one inner sleeve member of the two adjacent sleeve members onto the other sleeve member of the two adjacent sleeve members, thereby forcing the other sleeve member toward the stop means.

The above and other objects, features and advantages of the present invention will become more apparent from the following description of the preferred embodiments thereof, taken in conjunction with the accompanying drawings.

DETAILED DESCRIPTION OF THE PREFERRED EMBODIMENTS

A first embodiment of the present invention will be explained with reference to FIGS. 2 to 4.

Recently, it has become typical usual for the brake system of a vehicle such as an automobile to include a booster for operating the master cylinder. The booster is designed so as to be provided in the shell thereof with a constant pressure chamber and a variable pressure chamber connected to the intake manifold of the engine of the vehicle, to boost the force applied on the brake pedal by utilizing the pressure difference between the two chambers and to transmit the force thus boosted to the master cylinder. The booster is not, however, an essential part of the present invention. So it is not shown in the figures and a detailed explanation thereof is omitted.

Figure 2:
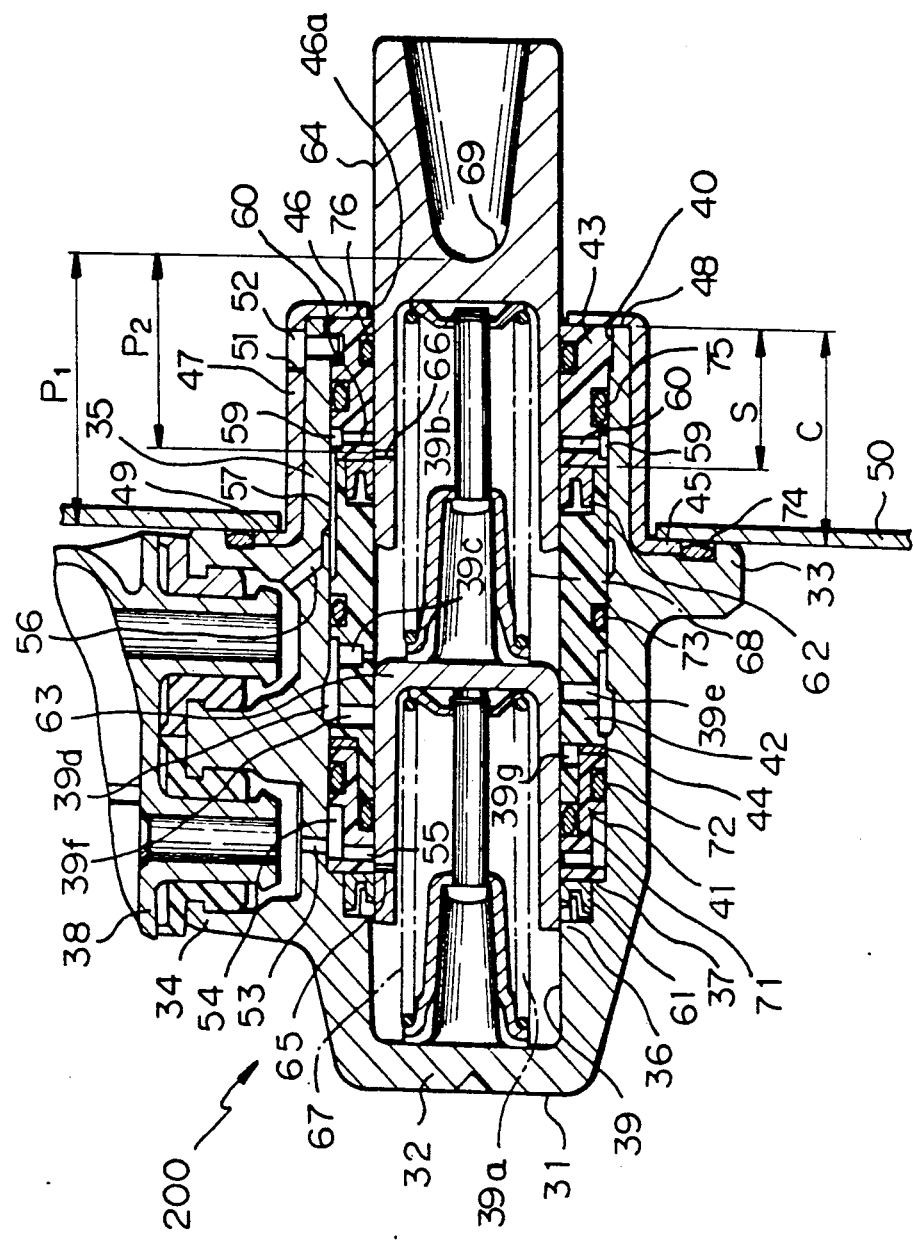
FIG. 2 is a sectional view of a master cylinder according to a first embodiment of the present invention.
Figures 3, 4:
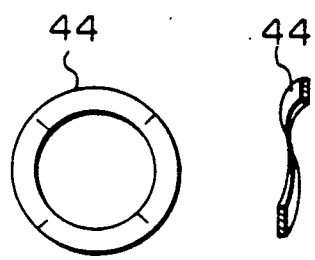
FIG. 3 is a front view of a resilient member employed in the embodiment shown in FIG. 2.
FIG. 4 is a sectional view of the resilient member.
Figure 5:
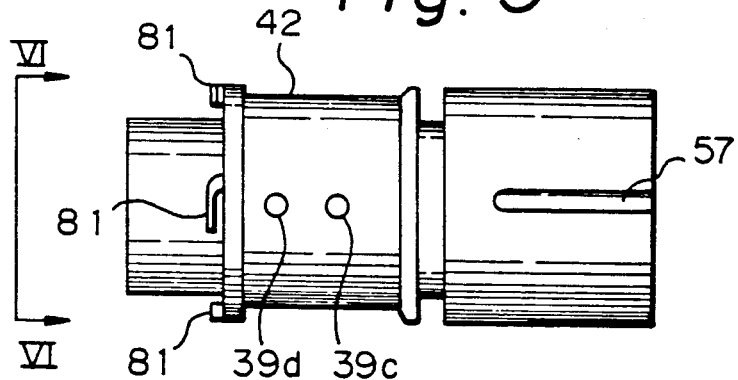
FIG. 5 is a side elevational view of a second embodiment of a resilient member mounted on a second sleeve.
Figure 6:
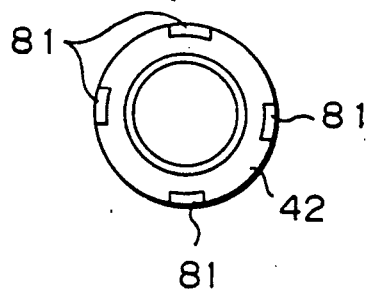
FIG. 6 is a front view taken along line VI—VI in FIG. 5.

FIG. 2 is a sectional view of a master cylinder 200 embodying the various features of the present invention. Reference numeral 31 designates a cylinder provided with a bottom 32. The cylinder 31 is further provided with a flange 33 radially extending from the outer surface thereof and a boss formed integrally therewith. The portion extending rightward (as viewed in FIG. 2) from the flange 33 constitutes a booster-inserting portion 35. The cylinder 31 is manufactured by casting and is provided with stepped portions 36 and 37 forming part of the inner surface thereof. An oil reservoir 38 is mounted on the boss 34.

First, second and third sleeves 41, 42, 43 are fitted in a cylinder bore 39 formed in the cylinder in the foregoing order from the bottom 32 side to opening 40. The front end (left end as viewed in FIG. 2) of the first sleeve 41 abuts the stepped portion 37 of the cylinder 31.

As shown in the figure, the first sleeve 41 includes a large inner diameter portion and a small inner diameter portion. The second sleeve 42 is provided with a small outer diameter portion formed on the front side thereof and a large outer diameter portion connected to the small outer diameter portion through a shoulder formed therebetween. The small outer diameter portion of the second sleeve 42 is fitted into the large inner diameter portion of the first sleeve 41. A resilient member 44 is disposed between the rear end of the first sleeve 41 and the shoulder formed between the small and large outer diameter portions of the second sleeve 42. As best shown in FIGS. 3 and 4, the resilient member is a leaf spring in the shape of a ring.

The rear end of the second sleeve 42 abuts against the front end of the third sleeve 43. In the condition where the three sleeves are fitted in the cylinder bore 39 as explained above, a cap 47 is fitted on the outer surface of the booster-inserting portion 35. The cap 47 includes a flange 45 formed at the open end thereof and a bottom portion 46. The cap 47 is manufactured by the deep-drawing of a metal plate. The cap 47 may alternatively be formed by synthetic resin mold forming. The cap 47 is provided with an opening 46a formed in the bottom 46. The cap 47 is mounted on the cylinder 31 with the bottom 46 abutting against the open end 48 of the cylinder 31, and with the flange 45 being received in a recess formed in the flange 33 of the cylinder 31 and being clamped between the flange 33 and a shell 50 of a booster to which the master cylinder 200 is connected. As shown, the rear end surface of the third sleeve 43 abuts against the bottom 46 of the cap 47. One or more holes 51 are formed in the circumferential wall of the cap 47 adjacent to the bottom portion 46. A screw or screws 52 are threaded into the cylinder 31 adjacent to the open end 48 and into the third sleeve 43 with the head of the screw 52 being received in the hole 51, thereby preventing the rotation of the cap 47 relative to the cylinder 31.

The first sleeve is provided in the front portion thereof with a communicating groove 54 and a communicating hole 55 for communicating with a supplying port 53 formed in the cylinder 31. The communicating hole 55 places the interior of the cylinder bore 39 in communication with the supplying port 53 through the communicating grove 54. A communicating groove 57 is formed in the outer circumference of the second sleeve 42 for communicating with another supplying port 56 formed in the cylinder 31. Adjacent to the front end of the third sleeve 43 are formed a communicating groove 59 and a communicating hole 60 open to the communicating groove 57. The communicating hole 60 places the interior of the cylinder bore 39 in communication with the supplying port 56 through the communicating grooves 57, 59.

A cup seal 61 is disposed between the stepped portion 36 of the cylinder and the first sleeve 41 while another cup seal 62 is disposed between the second and the third sleeves 42, 43 and in a recess formed in the rear end of the second sleeve 42.

A secondary piston 63 having a cup-like shape is slidably disposed in the first sleeve 41 and the second sleeve 42 while a primary piston 64 having a cup-like shape is also slidably disposed in the second sleeve 42 and the third sleeve 43. The secondary piston 63 and the primary piston 64 are provided with respective communicating holes 65 and 66 formed at predetermined positions in their circumferential walls.

A spring is disposed between the bottom 32 of the cylinder 31 and the secondary piston 63 for biasing the secondary piston 63 backward. A spring 68 is disposed between the secondary and primary pistons 63, 64 for biasing the primary piston 64 backward. Thus, oil pressurizing chambers 39a and 39b are defined in the cylinder bore 39 between the bottom 32 and the secondary piston 63 and between the secondary piston 63 and the primary piston 64, respectively.

The primary piston 64 extends to the outside of the cylinder. In the extending end of the primary piston 64 is formed a recess 69 for receiving an end of an output shaft of the booster (not shown).

Shown at 71, 72, 73, 74, 75 and 76 are seal rings.

When the primary piston 64 receives a driving force from the aforementioned output shaft of the booster (not shown), the primary piston 64 is displaced forward (leftward as viewed in FIG. 2) against the force of the spring 68. When the communicating hole 66 of the primary piston 64 passes the communicating hole 60 of the third sleeve 43 and further passes the rearmost end of the cup seal 62, the brake oil in the oil pressurizing chamber 39b is pressurized to generate a braking oil pressure. The braking oil pressure thus generated is transmitted through passages 39c, 39d, 39e, 39f and 39g communicating with the oil chamber 39b and further through an output port (not shown) to the brake cylinder of a brake (not shown), associated with a wheel, to operate the brake. At that time, the secondary piston 63 is also displaced forward. When the communicating hole 65 of the secondary piston 63 passes the communicating hole 55 of the first sleeve 41 and further passes the rearmost end surface of the cup seal 61, braking oil pressure is generated in the oil pressurizing chamber 39a. The braking oil pressure thus generated is transmitted through an output port (not shown) communicating with the chamber 39a to the brake cylinder of a brake (not shown), associated with a wheel, to operate the brake.

When the force acting on the aforementioned output shaft is released, the secondary piston 63 and the primary piston 64 are returned backward (rightward as viewed in FIG. 2) by virtue of the springs 67 and 68, respectively.

When reduction of pressure occurs in the oil chambers 39a and 39b during the return stroke, the outer peripheral portions of the cup seals 61 and 62 are deflected inwardly by virtue of the pressure difference between the inner and outer sides thereof, so that the oil in the reservoir 38 flows into the oil chamber 39a through the supplying port 53 and the clearance between the sleeve 41 and the inner surface of the cylinder bore 39 and to the oil chamber 39b through the supplying port 56, the communicating groove 57 and the clearance between the sleeves 42 and 43.

As explained above, in the master cylinder according to the present embodiment, the resilient member 44 is disposed between the sleeves and the cap 47 is secured to the cylinder 31 with the bottom 46 of the cap 47 abutting the open end of the cylinder 31. Excessive compressive force does not, therefore, act on the sleeves and thus, it is possible to prevent the sleeves from buckling or cracking.

Next, the ineffective stroke $T_1$ of the primary piston 64 of the master cylinder 200 as shown in FIG. 2 is determined by the following equation.

$$T_1 = (P_1 - P_2) - (C - S) \qquad (2)$$

in which $P_1$ = distance between the rear end surface of the flange 33 and the bottom of the recess 69, $P_2$ = distance between the center line of the communicating hole 66 and the bottom of the recess 69, $C$ = distance between the rear end surface of the flange 33 and the inner bottom surface of the cap 47, and $S$ = distance between the rearmost end surface of the cup seal 62 and the inner bottom surface of the cap 47.

Figure 1:
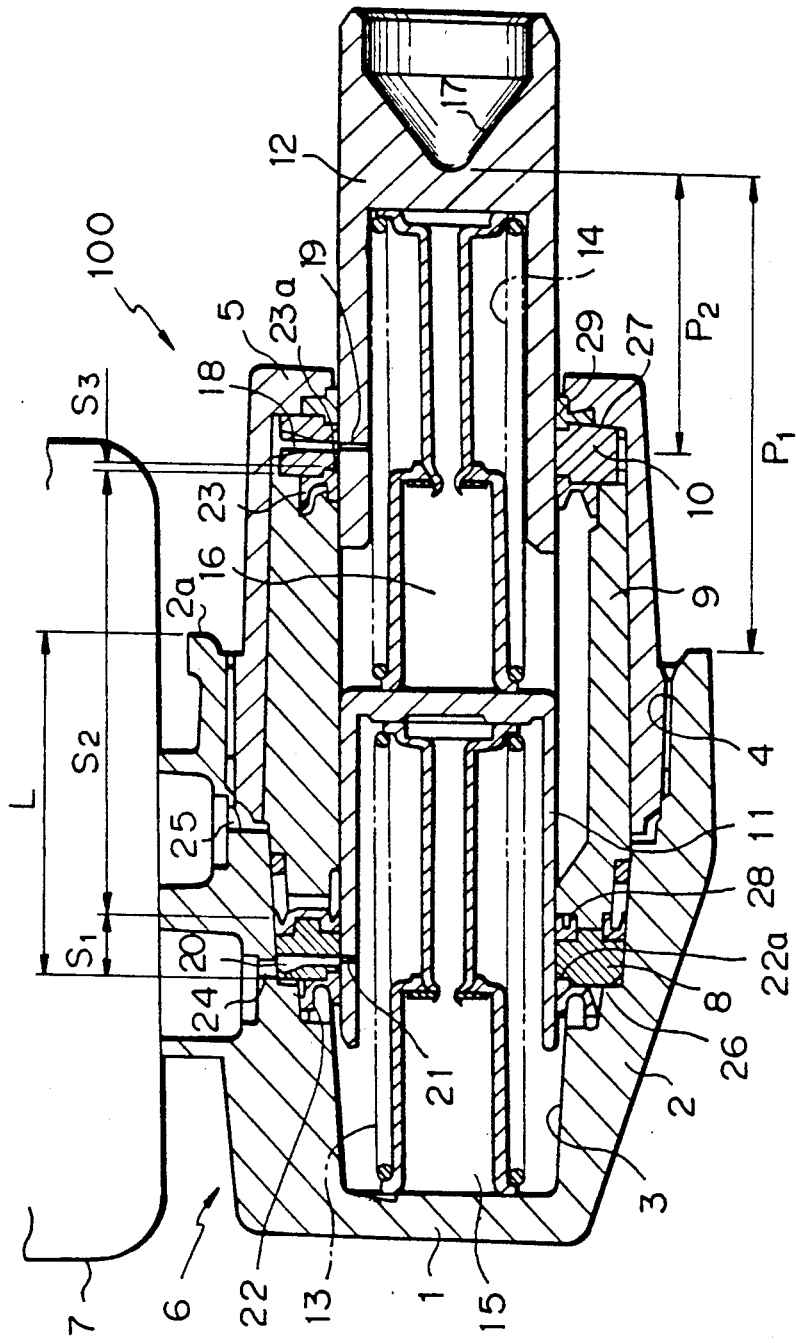
FIG. 1 is a sectional view of a conventional master cylinder.

As can be seen from equation (2), the ineffective stroke $T_1$ includes only four parameters which can affect the variation thereof, while the ineffective stroke $T$ of the prior art master cylinder 100 as shown in FIG. 1 includes 7 parameters as shown in equation (1). Thus, the variation in the ineffective stroke $T_1$ can be greatly reduced as compared to that in the ineffective stroke $T$ of the conventional master cylinder 100. The master cylinders 200 according to the present invention can therefore exhibit consistent performance characteristics.

When braking oil pressure is generated in the master cylinder 200, the first sleeve 41 receives force forcing it leftward as viewed in FIG. 2 by virtue of the difference between the left and right pressure receiving areas, while the second sleeve 42 receives force forcing it rightward. Thus, no force acts on the opposite sides of the resilient member 44 for compressively crushing the member 44 and consequently fatigue never occurs in the resilient member 44. The resilient member can therefore constantly press the first sleeve 41 against the stepped portion 37 and constantly press the third sleeve 43 against the inner bottom surface of the cap 47 through the second sleeve 42. Thus, the equation (2) is constantly established.

According to the present invention, the total length of a master cylinder can be comparatively short, so that the length by which the master cylinder is inserted into a booster can also be correspondingly short.

In the embodiment mentioned above, the resilient member 44 is manufactured as a separate element and is disposed between the first sleeve 41 and the second sleeve 42. In an alternative embodiment, however, a resilient member 81 may be formed integrally with the second sleeve 42 on the end surface thereof facing the first sleeve 41.

As explained above, the present invention provides a master cylinder including a cylinder having a cylinder bore formed therein, one end of the cylinder being open, a sleeve fitted into the cylinder bore, a piston slidably disposed in the sleeve, and stop means mounted on the one end of the cylinder for abutting against the sleeve to prevent the sleeve from coming off the cylinder. The sleeve comprises at least two sleeve members fitted into the cylinder bore and serially arranged from the inner side to the open side of the cylinder bore. The master cylinder further includes a cup seal disposed between two adjacent sleeve members of the at least two sleeve members and a resilient member for forcing one inner sleeve member of the two adjacent sleeve members onto the other sleeve member of the two adjacent sleeve members, thereby forcing the other sleeve member toward the stop means. In the master cylinder provided with the structure mentioned above, the aforementioned before-mentioned two sleeve members can easily be located in place, and the number of the parameters which can affect the variation in the ineffective stroke of the piston shown in FIG. 1 is reduced as compared to the prior art master cylinder 100. As a result, the variation in the ineffective stroke can be considerably reduced. Thus the present invention provides a master cylinder exhibiting consistent performance characteristics.

Further, the sleeves in the master cylinder of the present invention are not subjected to excessive compressive forces. Buckling and cracking of the sleeves is therefore prevented.

Further, it is also possible to utilize the space between two sleeves, in which space the resilient member is disposed, as a part of the passage communicating with the output port of the master cylinder. In that case, efficiency an in air purging operation in which oil is introduced into the master cylinder is greatly improved.

What is claimed is:

1. A master cylinder comprising: a cylinder defining a cylinder bore therein, the cylinder bore extending from an inner portion of the cylinder to one end of the cylinder such that said one end of said cylinder is open, a sleeve fitted to said cylinder within said cylinder bore, a piston slidably disposed in said sleeve, stop means disposed at a predetermined position at said one end of the cylinder and axially immovable from said position relative to said cylinder for abutting said sleeve to prevent the sleeve from coming off said cylinder, said sleeve comprising at least two sleeve members fitted to said cylinder within said cylinder bore in serial alignment in a direction from the inner portion to the open end of said cylinder, a cup seal disposed between two adjacent sleeve members of said at least two sleeve members, and a resilient member forcing the inner sleeve member of said two adjacent sleeve members onto the other sleeve member of said two adjacent sleeve members, thereby forcing said other sleeve member toward said stop means.

2. A master cylinder as claimed in claim 1, wherein said cylinder is provided with first and second stepped portions defining part of said cylinder bore, wherein said at least two sleeve members include first, second and third sleeve members fitted to said cylinder within said cylinder bore, the first sleeve member abutting against said second stepped portion, wherein said cup seal comprises a first cup seal member disposed between said first stepped portion and said first sleeve member and a second cup seal member disposed between said second and said third sleeve members, and wherein said resilient member is disposed between said first and said second sleeve members.

3. A master cylinder as claimed in claim 1, wherein said stop means comprises a cap mounted on said open end of said cylinder, said cap being provided with an opening through which said piston extends, and wherein an outer end of the outermost one of said at least two sleeve members abuts against said cap adjacent to said opening.

4. A master cylinder as claimed in claim 1, wherein said resilient member comprises a leaf spring in the shape of a ring.

5. A master cylinder as claimed in claim 1, wherein said resilient member is formed integrally with said inner sleeve member.

6. A master cylinder as claimed in claim 1, wherein said master cylinder is a tandem type master cylinder in which said piston defines primary and secondary chambers therein, wherein said at least two sleeve members include first, second and third sleeve members fitted to said cylinder within said cylinder bore, wherein said cup seal comprises a first cup seal member disposed between said cylinder and the first sleeve member and a second cup seal member disposed between said second and said third sleeve members, wherein said resilient member is disposed between said first and said second sleeve members, and wherein said first and said third sleeve members are respectively provided with an oil port for allowing oil to be supplied to said primary and said secondary chambers, respectively.

* * * * *